Jan. 18, 1927.
W. C. FERGUSON
1,615,008
PIPE JOINTING APPARATUS
Filed Dec. 4, 1924
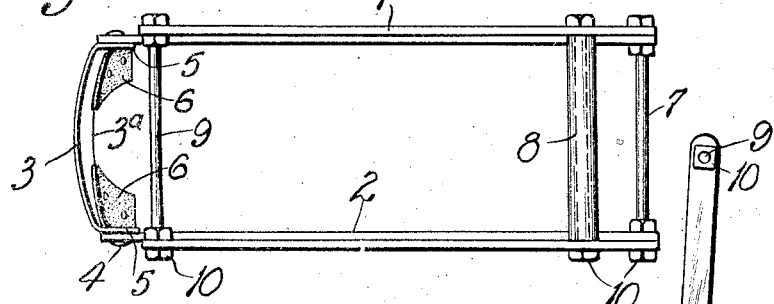
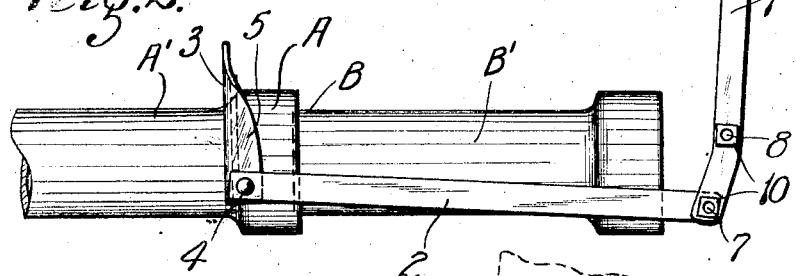
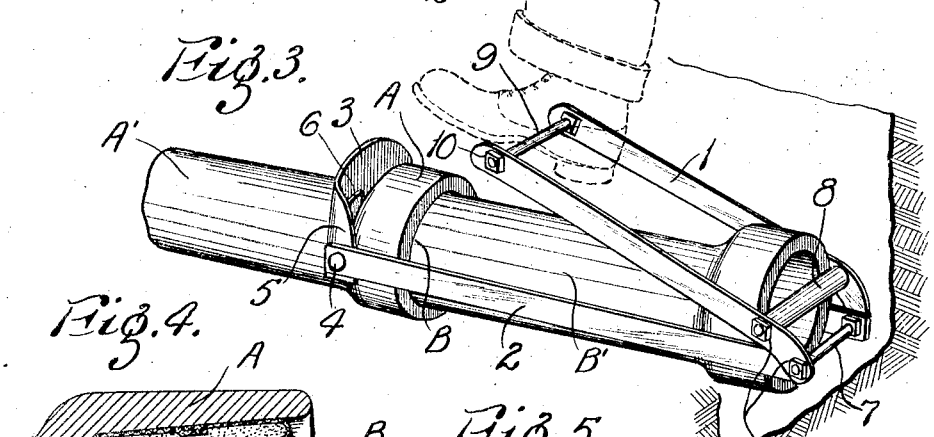
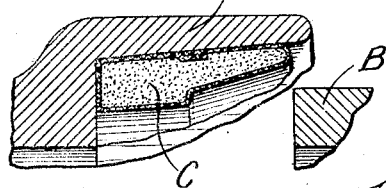
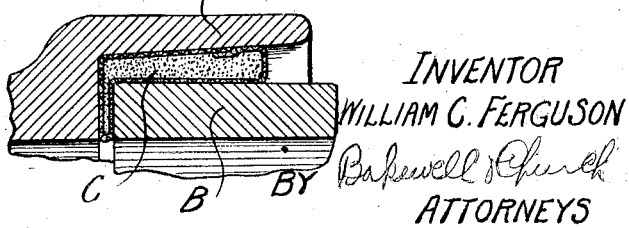
INVENTOR
WILLIAM C. FERGUSON
BY
ATTORNEYS Patented Jan. 18, 1927.

1,615,008

UNITED STATES PATENT OFFICE.

WILLIAM C. FERGUSON, OF ST. LOUIS, MISSOURI.

PIPE-JOINTING APPARATUS.

Application filed December 4, 1924. Serial No. 753,913.

This invention relates to an apparatus that is adapted to be used in the operation of jointing sewer pipe and water pipe of the bell and spigot type in the manner disclosed in my pending application for patent Serial No. 719,795, filed June 13, 1924, for pipe jointing element.

In my said pending application I have illustrated and described a jointing element for pipe of the type mentioned that consists of a deformable member, composed of a plastic water-proof core encased in a flexible, porous casing, which is adapted to be arranged inside of the bell of one pipe and then subjected to pressure by the spigot end of the adjacent pipe so as to cause said member to fill the space between the spigot and bell and adhere to the opposed surfaces of same, thereby producing an inexpensive water-tight joint that is easy to install and which has sufficient elasticity or flexibility to prevent it from opening up or causing the bell of the pipe to break in the event the pipe settles.

The object of my present invention is to provide an apparatus for installing a pipe jointing element of the kind mentioned that is easy to operate and arrange in operative relationship with the pipe, even under adverse conditions, and which is of such construction that it is bound to exert sufficient endwise pressure on the pipe to insure the jointing element being deformed properly and forced into intimate engagement with the bell and spigot.

Figure 1 of the drawings is a top plan view of my improved pipe jointing apparatus.

Figure 2 is a side elevational view of said apparatus, showing it in operative relationship with two pipes which are to be jointed.

Figure 3 is a perspective view, illustrating the method of using the apparatus.

Figure 4 is a sectional view, illustrating a deformable jointing element of the kind disclosed in my said pending application arranged in operative position in the bell of one pipe prior to forcing the spigot end of the other pipe into the bell; and Figure 5 is a sectional view, illustrating how said jointing element is deformed and forced into snug engagement with the outer surface of the spigot and the inner surface of the bell when the spigot is forced "home" or moved endwise into the bell.

In the drawings A designates the bell on one end of a conventional sewer pipe A', B designates the spigot end of an adjacent pipe B' that is adapted to be surrounded by said bell and C designates as an entirety a deformable, water-proof jointing element that is adapted to be arranged inside of the bell A, as shown in Figure 4, and thereafter deformed and pressed into intimate engagement with the interior of the bell A and the exterior of the spigot B, as shown in Figure 5, by moving said spigot endwise into said bell.

In order that the operation of forcing the spigot "home" may be performed quickly and reliably by an unskilled workman, even when the pipes being jointed are submerged in water at the bottom of a ditch, I have devised an apparatus, which, in its simplest form, consists of a lever 1 for exerting endwise pressure on the pipe B' in a direction to force the spigot B of same into the bell A of the adjacent pipe A' and a base piece or supporting structure 2 for the lever 1 that maintains said lever in operative relationship with the pipe A' during the operation of forcing the spigot B into the bell A. The base piece 2 of the apparatus can be constructed in various ways without departing from the spirit of my invention, but in order to make the apparatus practicable from a commercial standpoint, the part that carries the lever 1 and which prevents the pivot of said lever from moving away from the pipe A', during the operation of deforming the jointing element C, should be constructed in such a manner that it can be quickly arranged in operative relationship with the pipe that carries the bell, and moreover, will not be affected by slight irregularities in said pipe. Likewise, the lever or part of the apparatus that exerts endwise pressure on the pipe which carries the spigot should be constructed in such a way that it can be quickly positioned in operative relationship with said pipe. Accordingly, I prefer to construct the base piece 2 of the apparatus in such a way that a portion of same extends transversely of the pipe A' in engagement with the shoulder of the bell A when said base piece is arranged on the bottom of a ditch at such a point that it projects forwardly from the pipe A', and mount the lever 1 on said base piece in such a manner that when said lever is moved in one direction, a part on same engages the free end or outer end of the pipe B' and moves said pipe endwise so as to cause the spigot end of same to squeeze the jointing element C into the condition shown in Figure 5.

In the apparatus herein illustrated the base portion 2 comprises two parallel side bars joined together at one end by a transversely-disposed abutment member 3 whose bottom edge is curved at 3ª, as shown in Figure 1, so that it will conform approximately to the exterior of the top half of the pipe A', and thus cause said abutment member to bear against the shoulder on the bell A when said side bars are subjected to pressure in a direction tending to move them forwardly with relation to the pipe A'. The rear ends of the side bars of the base piece 2 are connected by rivets 4 or any suitable means to forwardly-projecting flanges 5 on the abutment member 3, and if desired, said abutment member may be provided with pads 6 of leather or some other suitable material so as to prevent the abutment member from chipping or cracking the bell with which it contacts during the jointing operation. The lever 1 also comprises two side bars pivotally connected at their lower ends by a pivot 7 to the front ends of the side bars of the base piece 2 and provided with a transversely-disposed thrust member 8 which is adapted to engage and exert endwise pressure on the front end or free end of the pipe B' when said lever is swung downwardly from the position shown in Figure 2 into the position shown in Figure 3. The side bars of the base piece 2 and of the lever 1 are spaced apart far enough to prevent the bell on the front end of the pipe B' from interfering with the movement of the lever 1 when said lever is depressed to force the spigot B into the bell A, and in order to prevent the front end of the pipe B' from being chipped or defaced by the thrust member 8 that engages same, said thrust member is provided with a covering of rubber or some other non-metallic substance.

At the upper end of the lever 1 is a foot piece 9 on which the operator's foot is adapted to be positioned to depress said lever, and if desired, the side bars of said lever can be bent or curved slightly adjacent their lower ends, as shown in Figures 2 and 3. The pivot 7, thrust member 8 and foot piece 9 of the lever 1 are herein illustrated as being formed by bolts or threaded rods provided with nuts 10 arranged so that the foot piece 9 serves as a spacing device for the upper ends of the side bars of the lever 1 and the pivot 7 serves as a spacing device for the front ends of the side bars of the base piece 2.

In forming a pipe joint with an apparatus of the construction above described a deformable jointing element C, which may be of the construction described in my said pending application or of any other suitable construction, is positioned inside of the bell A of the pipe A', the pipe B' is arranged in longitudinal alignment with the pipe A', with the spigot B positioned adjacent the front end of the bell A, and the base piece 2 of the apparatus is arranged at the front end of the pipe A' with the abutment member 3 of said base piece extending transversely across the top side of said pipe, and the side bars of said base piece projecting forwardly at the opposite sides of the pipe B'. To force the spigot B "home" the operator positions his foot on the foot piece 9 of the lever 1 and moves said lever downwardly towards the pipe B', thereby causing the thrust member 8 on said lever to bear against the bell at the front end of the pipe B' and move said pipe endwise in a direction to cause the spigot B to deform the jointing element C and cause said element to fill the annular space between the interior of the bell A and the exterior of the spigot B and adhere to the opposed surfaces of said parts. At the completion of this operation the lever 1 is swung upwardly into its upright position and the rear end of the base piece 2 is raised so as to disengage the abutment member 3 on same from the shoulder of the bell A, after which said base piece can be moved forwardly into operative relationship with the bell on the front end of the pipe B', preparatory to forming the next joint.

Such a pipe jointing apparatus is of such simple construction that it is not liable to break or get out of order when in use and it is highly reliable, because the base piece 2 and lever 1 are so combined that the operator knows, after he has forced the lever 1 downwardly its full stroke, that the spigot has been forced "home", or, in other words, moved far enough into the bell with which it co-operates to insure proper deformation of the jointing element interposed between said spigot and bell. In addition to the desirable characteristics above mentioned, the apparatus is of such design that it can be arranged in operative relationship with the pipe which are being jointed simply by dropping the base piece over the pipe at such a point that the abutment member 3 on the base piece will engage the shoulder of the bell inside of which the jointing element is positioned, thereby making it practicable to use the apparatus for jointing pipe that are submerged in water at the bottom of a ditch.

Having thus described my invention, what I claim as new and desire to secure by Letters Patent is:

1. A pipe jointing apparatus consisting of a base piece and a lever pivotally mounted on said base piece, said base piece and lever comprising side bars pivotally connected together at one end, a transversely-disposed abutment member connected to the side bars of the base piece and adapted to be arranged in engagement with the bell of one pipe, and a transversely-disposed thrust member carried by the side bars of the lever and adapted to be engaged with the front end of an adjacent pipe so as to exert pressure on same in a direction to force the spigot of said pipe endwise into the bell of the other pipe.

2. A pipe jointing apparatus consisting of a base piece comprising a transversely-disposed abutment member curved on its bottom edge so as to conform approximately to the top half of a pipe and thus permit said member to bear against the shoulder on the bell of the pipe, forwardly-projecting flanges on said abutment member, parallel side bars connected to said flanges and projecting forwardly from same, a lever composed of parallel side bars pivotally connected to the front ends of the side bars of the base piece, a foot piece on said lever, and a thrust member arranged transversely between the side bars of said lever and adapted to engage the front end of an adjacent pipe and move same endwise in a direction to force the spigot end of the pipe into the bell of the other pipe.

WILLIAM C. FERGUSON.